United States Patent [19]

Crow

[11] 4,124,079
[45] Nov. 7, 1978

[54] DRIVEN IMPLEMENT CONNECTED TO ROCKABLE MOTOR OF A VEHICLE

[76] Inventor: Harold J. Crow, R.R. 2, Box 191, Milford, Ill. 60953

[21] Appl. No.: 728,197

[22] Filed: Sep. 30, 1976

[51] Int. Cl.² ............... A01B 33/08; A01B 63/108; B60K 9/00
[52] U.S. Cl. .................. 172/114; 111/1; 172/198; 172/276; 172/292; 180/1 F; 180/53 FE; 180/64 M
[58] Field of Search ............ 172/114, 118, 142, 198, 172/260, 292, 438, 79, 116, 257, 276; 111/1, 52 WT; 180/64 M, 53 FE, 1 F, 53 C, 53 D; 37/43 B

[56] References Cited

U.S. PATENT DOCUMENTS

| | | | |
|---|---|---|---|
| 1,422,967 | 7/1922 | Griswold et al. | 172/142 X |
| 2,035,150 | 3/1936 | Dufour | 172/292 |
| 2,058,964 | 10/1936 | Dufour | 172/292 |
| 2,066,610 | 1/1937 | Carlin | 111/1 UX |
| 2,277,880 | 3/1942 | Noble | 172/198 X |
| 2,429,711 | 10/1947 | DuFour | 180/1 F |
| 2,455,147 | 11/1948 | Traver | 111/1 X |
| 2,556,072 | 6/1951 | Dewey | 172/276 X |
| 3,128,729 | 4/1964 | Henson | 111/1 |
| 3,205,642 | 9/1965 | Smith | 172/292 X |
| 3,810,513 | 5/1974 | Spiller et al. | 172/292 |

FOREIGN PATENT DOCUMENTS

| | | | |
|---|---|---|---|
| 880,227 | 7/1949 | Fed. Rep. of Germany | 172/292 |
| 2,103,252 | 8/1972 | Fed. Rep. of Germany | 180/1 F |
| 1,055,728 | 2/1954 | France | 37/43 B |
| 663,461 | 5/1964 | Italy | 172/292 |
| 885,939 | 1/1962 | United Kingdom | 111/1 |

*Primary Examiner*—Edgar S. Burr
*Assistant Examiner*—Steven A. Bratlie
*Attorney, Agent, or Firm*—Peck & Peck

[57] ABSTRACT

A self-propelled tiller-planter including a motor providing hydraulic motive power for various operating mechanisms. A tiller pushed by said planter and hydraulic means is provided for lifting and lowering the tiller assembly into inoperative position above the ground and into operative tilling position in contact with the ground. A pivoting cradle is provided to which the motor is fixed, the cradle rocking simultaneously with the up and down movements of the tiller insuring that the shaft to the tiller assembly is in alignment with the motor. Since the tiller is pushed at the front of the planter the soil being worked thereby may be packed down by the wheels which follow the tiller and means are provided at the rear of the rear wheels of the planter to rework the soil for the planting operation.

1 Claim, 15 Drawing Figures

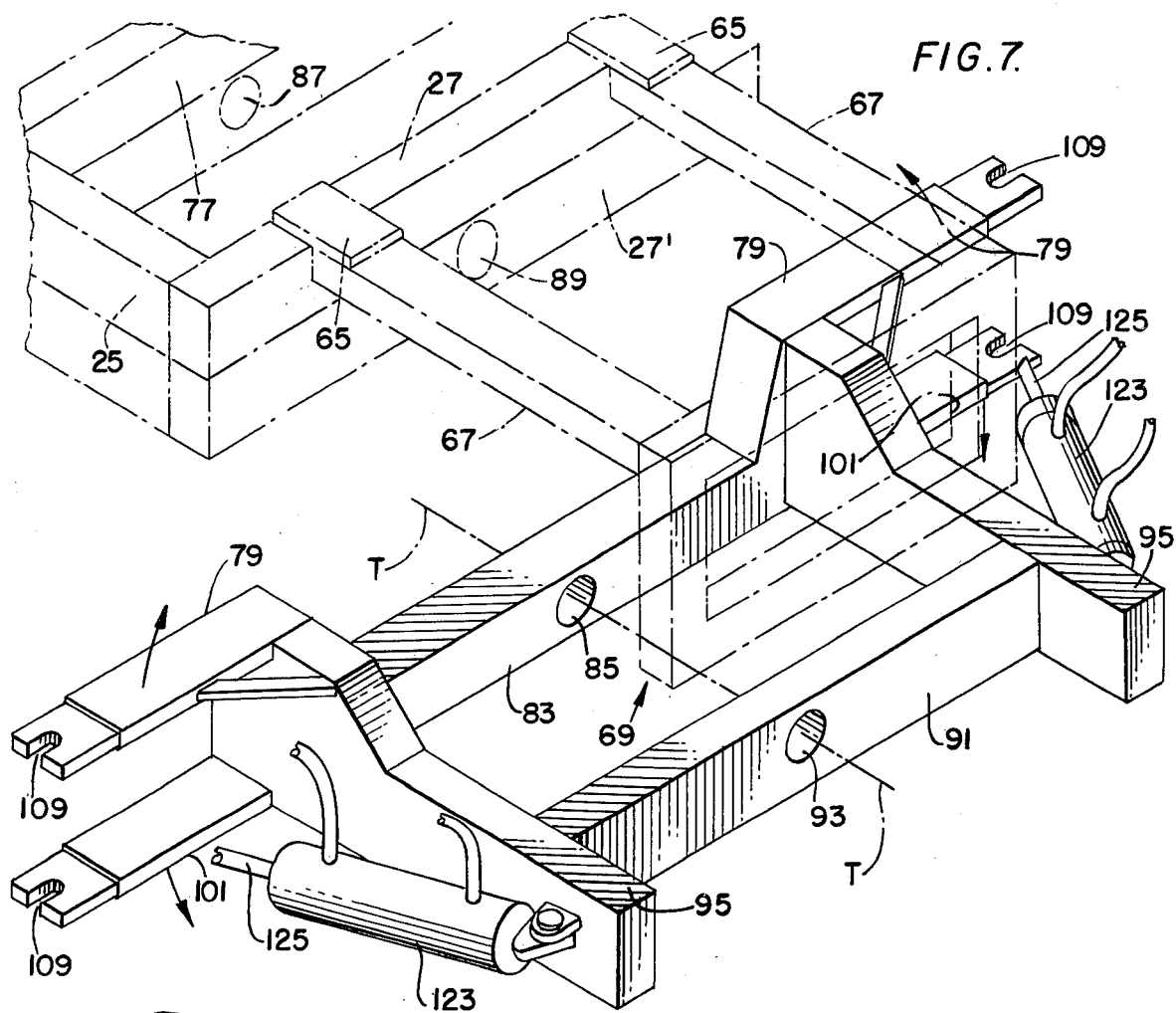
FIG. 7.
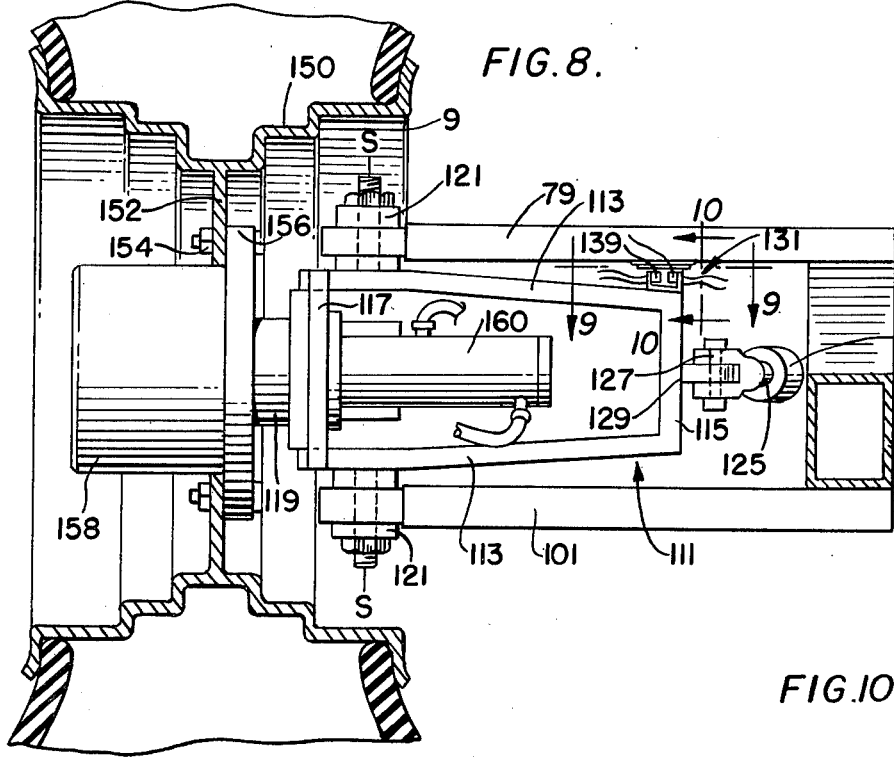
FIG. 8.
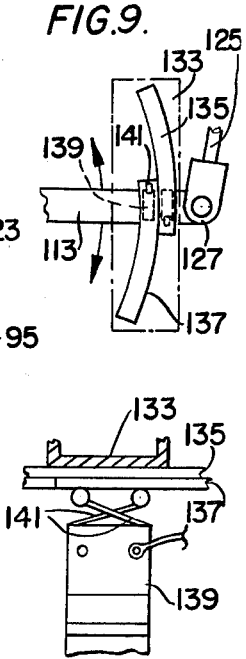
FIG. 9.
FIG. 10.

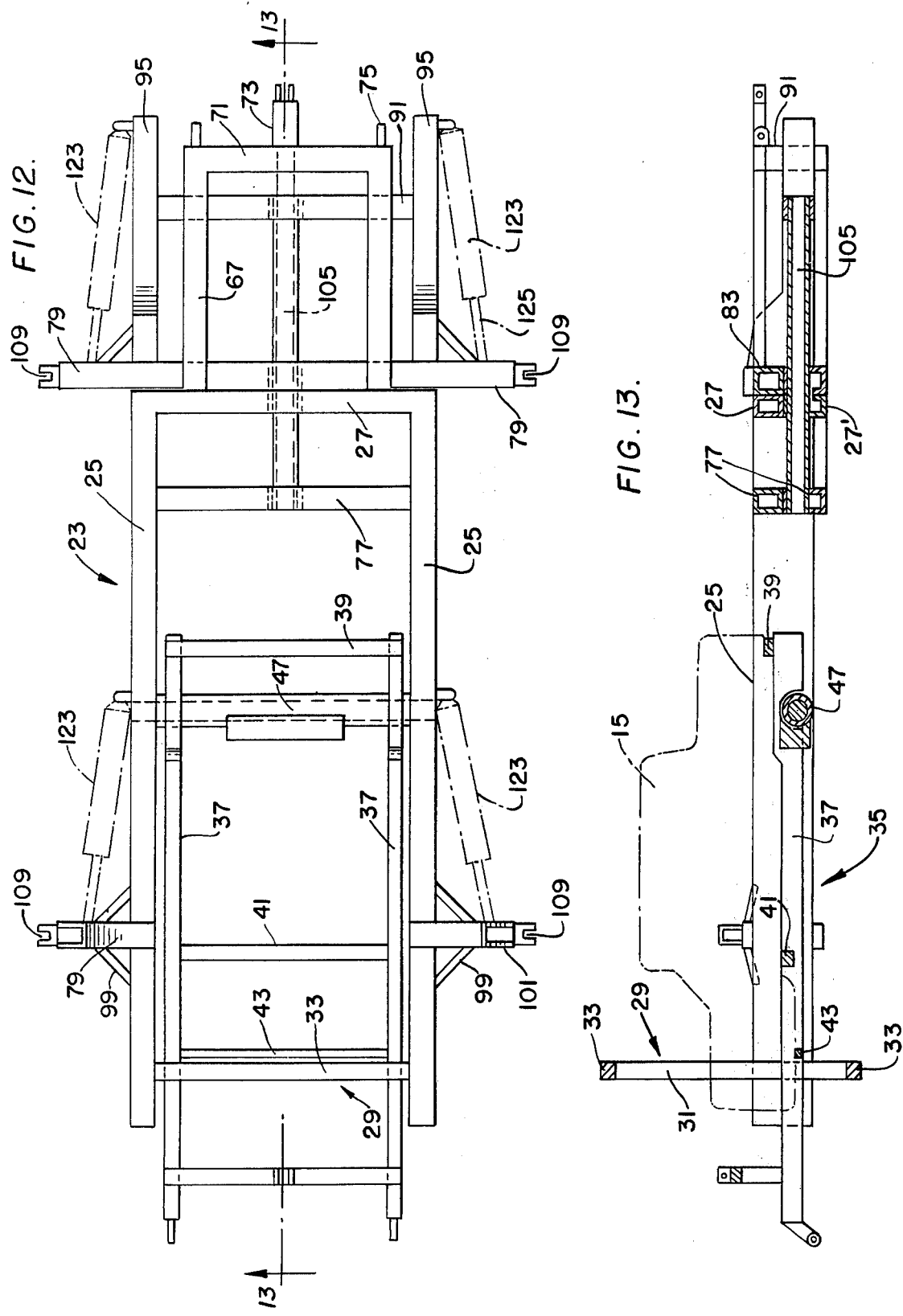

DRIVEN IMPLEMENT CONNECTED TO ROCKABLE MOTOR OF A VEHICLE

BRIEF SUMMARY OF THE INVENTION

This invention relates to a farm implement or unit which prepares soil, either plowed or unplowed, with an ideal seed bed, plants the seed, and if desired applies fertilizer, herbicide and insecticide to the prepared soil. This operation is accomplished in one trip across the field.

It has been my experience that certain problems are encountered in an implement of this character wherein all of the operating components thereof are hydraulically selectively operable and wherein a tiller of any suitable type is pushed by means of the motive power unit and wherein lifting and lowering means is provided for the tiller. One of these problems has been solved in the following manner. The motor which furnishes the hydraulic power for the various operating components and for driving the entire farm implement also provides the power for driving the tiller and since the drive shaft from the motor to the tiller must be in proper alignment, regardless of the position of the tiller, the motor is bedded on a rocking or pivoting cradle to accommodate the lifted and lowered positions of the tiller.

The motive power unit which pushed the tiller and tows the planter is mounted on and driven by four wheels, and each wheel is independently driven by means of a hydraulic motor operatively connected to and operating directly on the wheel which insures a direct drive. The independent operation of each wheel is controlled by the operator of the implement.

Each wheel is steerable by hydraulic means controlled by the operator and the rear wheels of the four wheels for the motive power unit are suspended from the chassis of the motive power unit in such a manner that they may rock on a horizontal and longitudinally extending axis to accommodate unevenness in the terrain over which the implement is traveling. Since the operator will have complete control of the actuating means for each wheel, it will be appreciated that if one of the wheels of the four drive wheels spins in a mud hole or the like, the actuating hydraulic power to that wheel may be cut off.

Means is provided for centering of the two rear wheels if separate steering is not desired, as for instance when the implement is traveling over a road. The operator of the implement is thereby assured that the rear wheels are centered without having to check a gauge. Thus, there is no manual operation required to center the rear wheels.

It will be recognized that the operator of the implement has complete control from his operating position in the cab of all of the components which are hydraulically actuated, and I have provided a hydraulic circuit for the steering system and the drive system and these are independently operable.

Additionally, this implement includes scarifier means actuable by the operator for the soil which may have been tamped down by the wheels of the motive power unit.

The planter unit which is towed behind the motive power unit is also liftable and lowerable under the control of the operator.

Additional objects and advantages of the present invention will become more readily apparent to those skilled in the art when the following general statements and descriptions are read in the light of the appended drawings.

BRIEF DESCRIPTION OF THE DRAWINGS

FIG. 7 is an exploded fragmentary perspective view of the structure shown in FIG. 6.

FIG. 8 is a vertical transverse sectional view taken through the hub of a wheel assembly and also illustrating the electrical centering mechanism.

FIG. 9 is a fragmentary plan view of the wheel centering means taken along the line 9—9 of FIG. 8.

FIG. 10 is a side view of the wheel centering switches taken on the line 10—10 of FIG. 8.

FIG. 12 is a plan view of the chassis assembly of the farm implement.

FIG. 13 is a longitudinally vertical sectional view of the chassis taken on the line 13—13 of FIG. 12.

DESCRIPTION OF THE INVENTION

Figure 1:
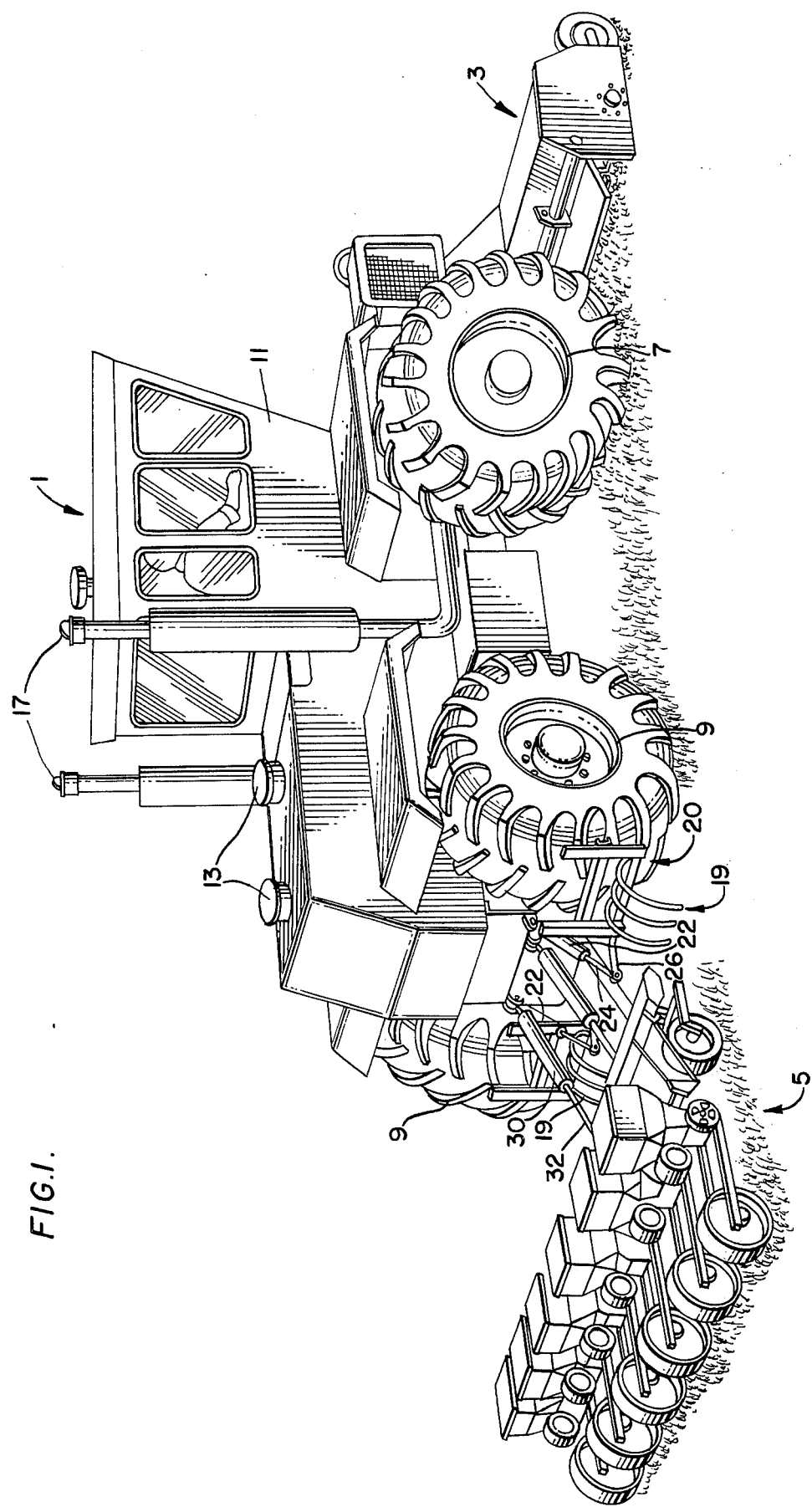
FIG. 1 is a perspective view of the farm implement as viewed from the rear thereof.
Figure 2:
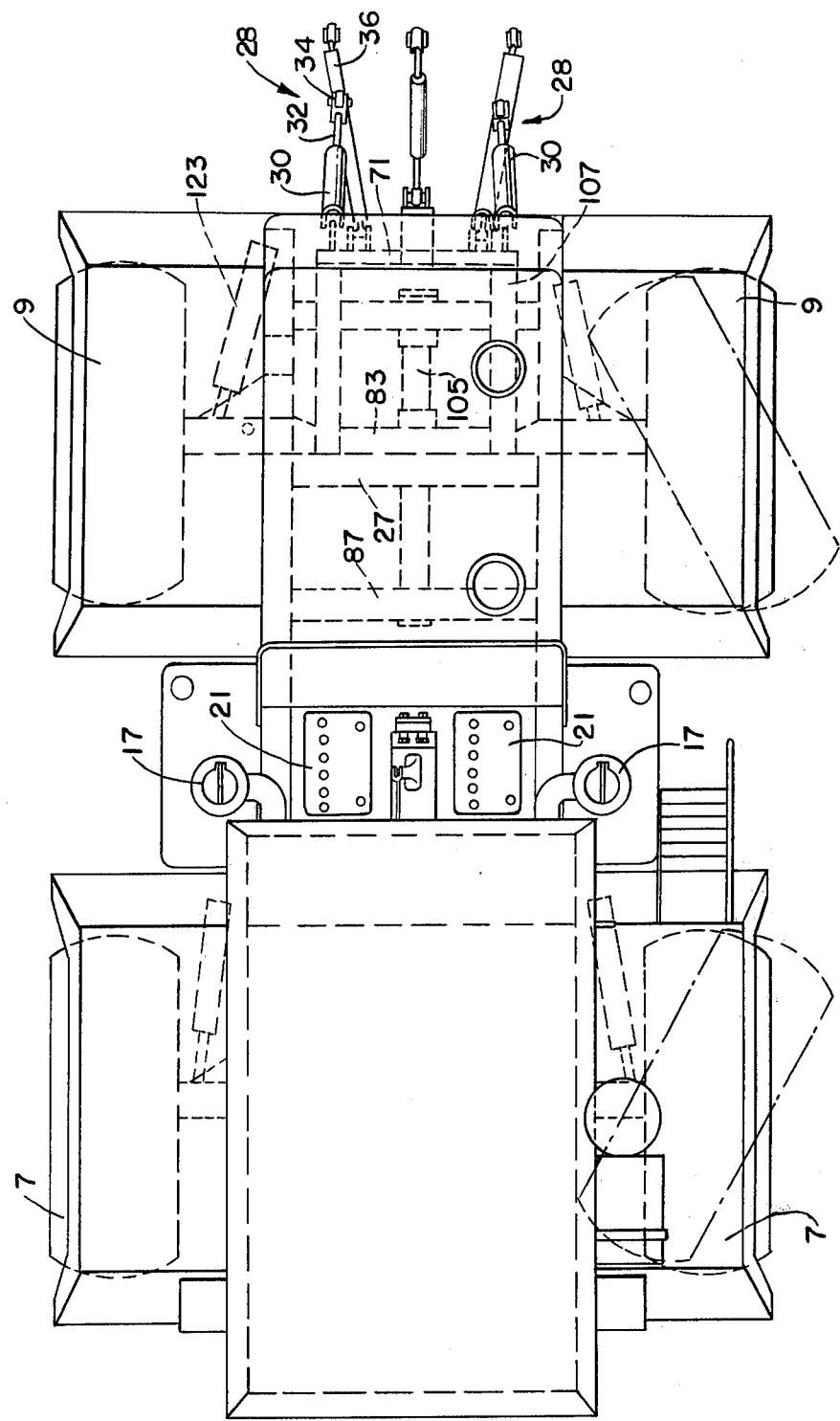
FIG. 2 is a plan view of the farm implement.
Figure 3:
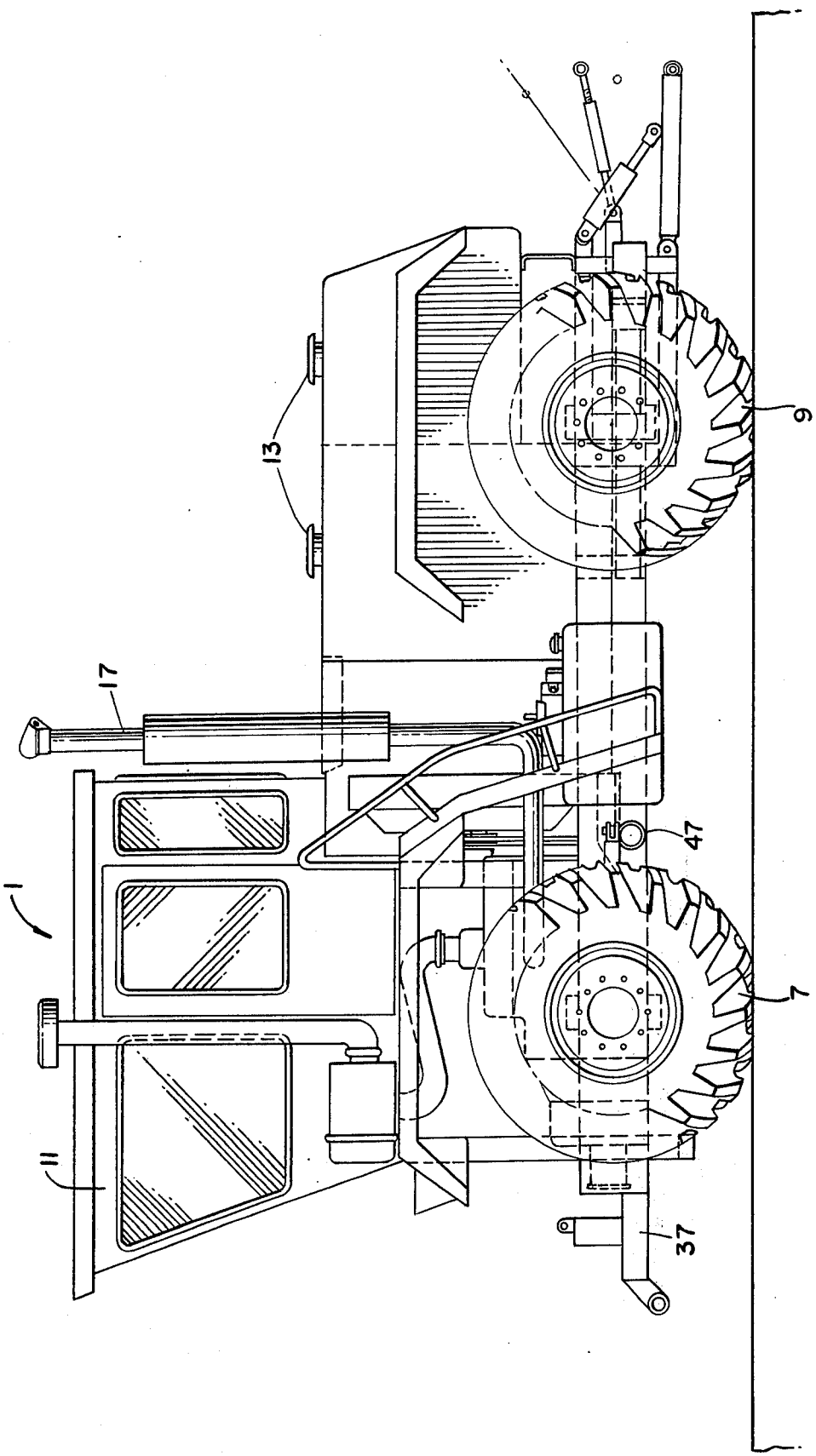
FIG. 3 is a side elevation of the farm implement as viewed from the left, the tiller and planter modules being omitted.
Figure 4:
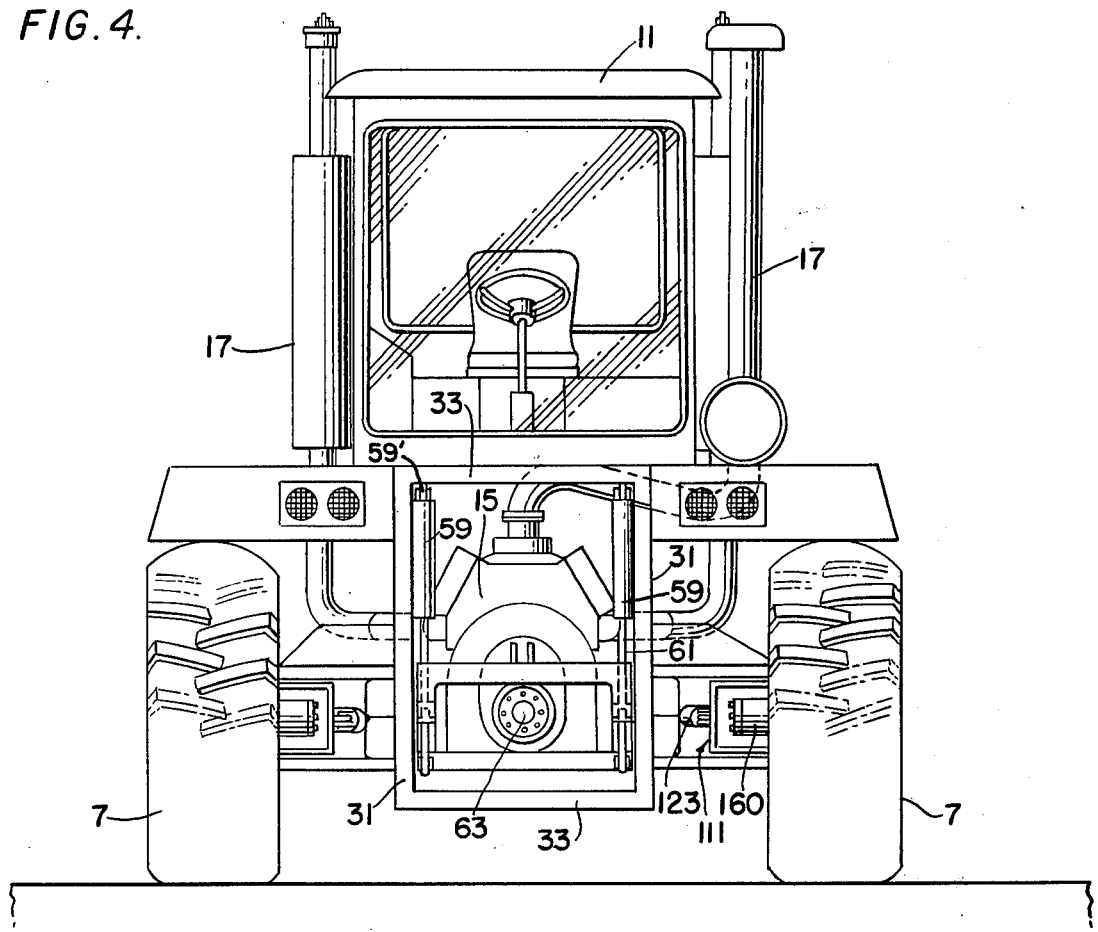
FIG. 4 is a front elevation of the farm implement, particularly illustrating the draft control mechanism for the tiller.

In the accompanying drawings the numeral 1 has been used to designate in its entirety the motive power unit of the farm implement, the numeral 3 has been used to designate generally the tiller assembly which is attached to the forward end of the motive power unit 1 to be pushed forwardly thereby. The numeral 5 generally designates the planter assembly which is towed by the motive power unit. The tiller and planter assemblies 3 and 5 may be of any suitable type which is found desirable for use in combination with a farm implement of this character. The motive power unit is mounted on a pair of front drive wheels 7 and a pair of rear drive wheels 9. Any suitable cab 11 in which the operator of the implement is seated and from which the various components of the implement are operated may be provided. Adjacent the rear end of the motive power unit are positioned fertilizer, herbicide and/or insecticide tanks 13 from which the treating material is applied to the soil and incorporated by the tiller assembly 3 as the farm implement moves forwardly to the right as viewed in FIG. 1. Any known and suitable means may be used for applying the soil treating media from the tanks 13. As will become apparent as this description proceeds, a motor 15 (see FIG. 4) is cradled beneath the cab 11 and is operable to cause hydraulic actuation of the various components of the implement. A pair of exhaust stacks 17 eject the exhaust from the motor 15. Adjacent to but rearwardly spaced from the rear wheels 9 are a pair of transversely spaced apart scarifiers 19, the purpose of which will be explained hereinafter in detail. As will be evident from consideration of FIG. 2 of the drawings, batteries 21 are provided and the motive power unit may carry any other units which are necessary for the operation of the motor 15, since these form no part of the present invention, it is not thought necessary to consider them in detail.

In FIGS. 12 and 13 of the drawings, the chassis and certain other assemblies of the motive power unit of the implement are illustrated. The main frame of the motive power unit is designated generally by the numeral 23 and comprises a pair of transversely spaced apart longitudinally extending side members 25. A rear transverse member 27 extends between and is fixed to the side members 25. The chassis also includes a generally rectangular member designated generally by the numeral 29 which is adjacent to but slightly rearwardly removed from the forward ends of the side members 25 and this member includes a pair of transversely spaced vertically extending elements 31 and an upper and lower transversely extending element 33, each of which is fixed to the vertically extending elements 31. The rectangular frame like member 29 extends below the side frame members 25 as especially illustrated in FIG. 13 of the drawings. The vertically extending elements 31 of the rectangular member 29 are fixed to each side member 25 in any suitable manner.

Figure 11:
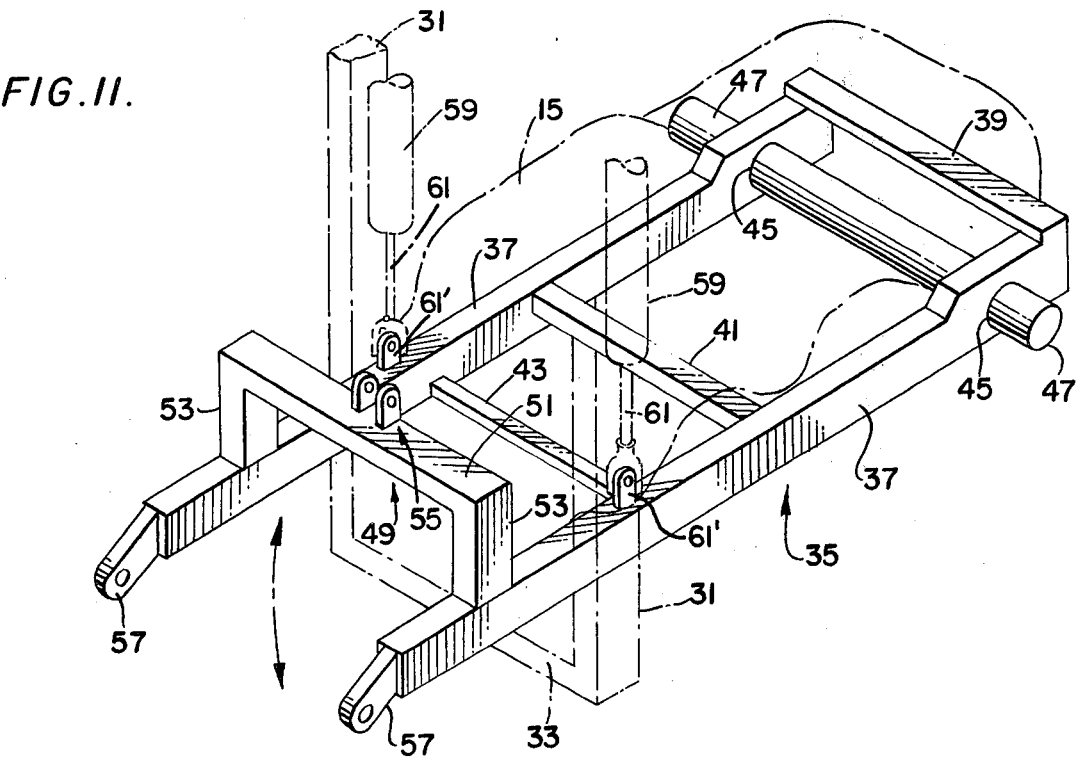
FIG. 11 is a fragmentary detailed perspective view of the tiller draft control and engine pivoting cradle assembly.

I provide a motor mounting means or rocking cradle, which as has been explained, is mounted in the motive unit beneath the cab 11 and this motor mounting means or cradle which is designated generally by the numeral 35 is pivotally operable on a transverse horizontal axis between the vertically extending members 31 of the rectangular frame 29. With reference particularly to FIG. 11 of the drawings, it will be recognized that the cradle comprises a pair of transversely spaced side frame members 37 which extend forwardly from a reinforcing cross piece 39 which is fixed at its ends to the rear ends of the frame members 37. A pair of longitudinally spaced apart motor supporting elements 41 and 43 extend between the frame members 37 and the ends of each are fixed to said frame members. It will be recognized that the motor 15 may be secured to the cross pieces in any suitable manner. Each frame member 37, adjacent to but forwardly spaced from their rear ends, is provided with circular apertures 45, these apertures extend through the frame members 37 and are in alignment. Extending through and beyond these apertures 45 is a preferably, though not necessarily, a tubular pivot member 47 and the pivot member 47 extends at each end outwardly beyond the frame members 37 and into the fixed side member 25 of the chassis. Adjacent to but rearwardly spaced from the forward ends of the frame members 37, I provide a member designated generally by the numeral 49 which comprises a transverse element 51 which is mounted on a pair of legs 53 which at their lower ends are fixed to the frame members 37. Centrally disposed on the transverse element 51 is a hitch 55 which may be of any suitable type and is adapted to hitch the tiller 3 to the motive power unit 1. The forward ends of the frame members 37 are provided with forwardly extending knuckle elements 57 which function to raise and lower the tiller assembly 3 from and to the soil. With respect to this attaching means embodying in part the knuckles 57, it will be recognized that anyone skilled in this discipline will understand this connection and since the connecting means does not per se form a part of this invention, it will not be described in detail. In order to cause rocking motion of the motor cradle 35 on its pivot 47, I provide a pair of hydraulically operated cylinders 59, the piston rods 61 thereof being pivotally attached as at 61' in any suitable manner to the frame members 37. The cylinders 59 are preferably pivotally attached at their upper ends to the upper element 33, as at 59'. Any suitable means may be provided for charging the cylinders 59 with fluid and for releasing it from the cylinders when it is desired to lower the cradle, the actuation of these cylinders is controlled by the operator of the farm implement.

It will now be appreciated that when it is desired to either raise or lower the tiller, the cylinders 59 are properly actuated to thereby lift or lower the motor cradle 35 which pivots on the tube or the like 47, the knuckles 57 also being raised or lowered, and the power take off 63 will automatically and at all times be aligned with the tiller and motor. Thus, the cradle 35 is rocked relative to chassis 23.

Figure 5:
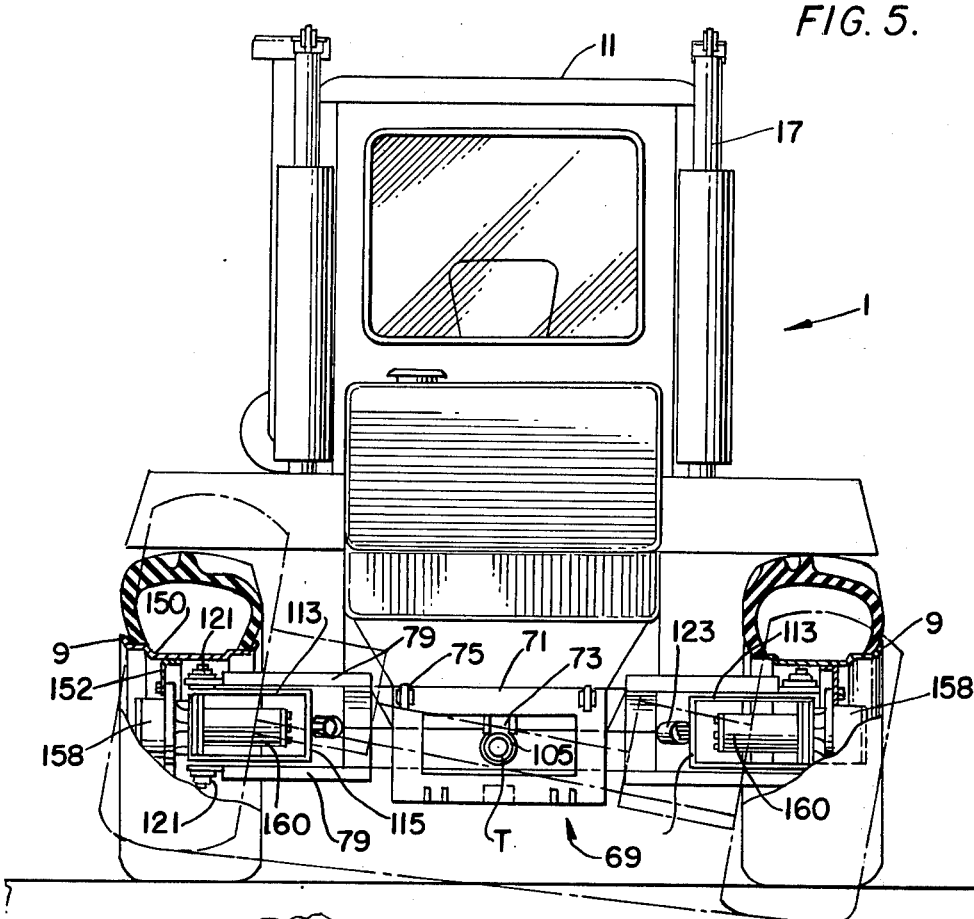
FIG. 5 is a rear elevation of the farm implement especially illustrating the wheel mounting assembly, the steering and rocking mechanisms.

As I have stated above, the rear wheels 9 of the motive power unit are so mounted that rocking or tilting motion may occur on a longitudinal horizontal axis which I have designated by the letter T in FIG. 5. of the drawings, and it will be noted that in this figure the phantom lines clearly indicate this rocking or tilting motion of the rear wheels on the horizontal axis T. Welded or otherwise securely fastened in transverse spaced relationship to the upper surface of the transverse member 27 are a pair of generally flat connecting members 65 for connecing the main chassis frame to the rear wheel frame and assembly. These connecting members 65 extend rearwardly from the transverse member 27 as clearly illustrated in FIG. 6, and rearwardly extending from and fixed to the under surfaces of connecting members 65 are a pair of transversely spaced rearwardly and longitudinally extending frame members 67. Fixed to and extending between the rear ends of the members 67 is a rectangular frame member generally designated by the numeral 69. The upper transverse member 71 of the rectangular frame 69 has fixed thereto any suitable type of planter hitch 73 and spaced therefrom and extending rearwardly from the rectangular frame 69 are a pair of connecting means 75 which function to operate means of any suitable type for raising and lowering the planter which is being towed.

Extending between and fixed at each end to the side members 25 of the main chassis are a pair of transverse elements 77 having a circular aperture therein which is designated generally by the numeral 87 and is substantially mid-way between the ends of the elements 77 and in line with the axis T. The rocking mounting and frame work for the rear wheels comprises a pair of upper arms 79 which extend laterally beyond the side frame members 25. Each of the upper arms 79 is positioned slightly rearwardly of the rear transverse members 27 and 27' of the rear chassis and are provided with downwardly depending portions 81 from the bottoms of which extend a transverse rocking element 83 having a circular aperture therethrough which I have designated generally by the numeral 85, this aperture being in line with the generally designated aperture 87 in the transverse fixed elements 77 and also in alignment with the generally designated circular aperture 89 in the lower transverse frame member 27'. I provide a further transverse member 91 rearwardly spaced from said transverse element 83 and this transverse member is provided with a circular aperture 93 therein which is in line with the circular apertures 85, 87 and 89. A pair of transversely spaced rearwardly extending beam members 95 are provided and the forward ends of these beam members are spaced rearwardly from the side frame members 25 of the main chassis so that the arms 79 may rock, as will be explained, between the forward ends of the members 95 and the rear ends of the side frame members 25. The transverse member 91 is fixed at each end as at 97 to the beam members 95. Reinforcing arms 99 may be provided between the arms 79 and the beam members 95. What I shall term lower laterally extending arms 101 extend from each side of the arrangement in a plane below the upper arms 79. I provide lower laterally extending arms 101 which extend beneath the beams 95 and are fixed thereto and at their inner ends are also fixed as at 103 to each end of the transverse rocking member 83. A pivot tube or the like pivoting means 105 provides, in effect, a pivot means. The pivot element 105 is received in the aperture 87 and is fixed to the elements 77, which it will be appreciated, are fixed to the main chassis. The pivot element 105 extends rearwardly through the aperture 89 in the transverse member 27' and rearwardly from and rotatively extends through the aperture 85 in the transverse rocking element 83. At its rear end, the pivot element 105 extends through the aperture 93 in the transverse member 91 and is fixed thereto. On each side of the transverse rocking element 83 the pivot element has fixed thereto a collar or the like 107.

Consideration particularly of FIG. 7 of the drawings indicates that each arm 79 and 101 is provided with cut-out sections 109 and that these cut-out sections in the upper and lower arms are in alignment. A steering yoke or frame of generally elongated construction is designated generally by the numeral 111 and is formed with upper and lower extending members 113, an inner cross member 115 being connected to the ends of the upper and lower extending members 113. The outer end 117 of the yoke is fixed in any suitable manner to a part of the wheel hub 119. The yoke 111 is mounted for pivoting action on an axis S—S and is mounted by means of a pair of king pins or the like 121 which are mounted in the cut-out section 109 of arms 79 and 101. It will thus be appreciated that the yoke 111 when it is pivoted on the king pins on the axis S—S will cause steering movement in the wheel 9. This pivoting action is imparted to the yoke by means of a hydraulically operated cylinder 123 having a piston rod 125 extending from the front end thereof. The cylinder 123 at its other end is pivotally mounted on beam 95. A clevis 127 operatively connects the outer end of the piston rod with the inner cross member 115 of the yoke, the fixation of the clevis to cross member 115 occurring at 129.

Figure 15:
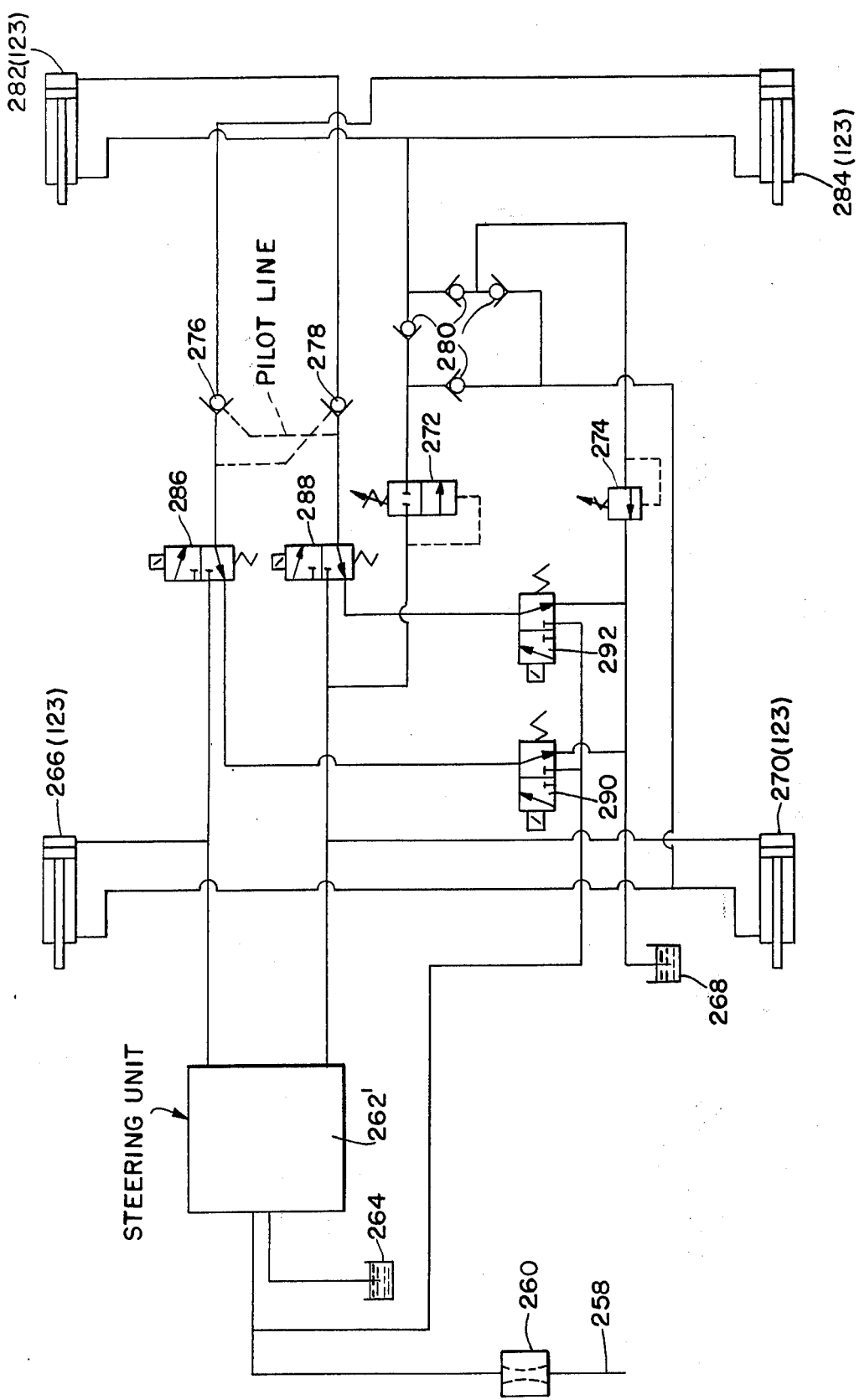
FIG. 15 is a schematic diagram of the hydraulic steering system.

It will now be appreciated that upon actuation of the cylinder 123, which is under the guidance of the operator and is controlled by the hydraulic circuit illustrated in FIG. 15, the yoke will be caused to pivot to thereby turn its particular wheel for steering. It will further be appreciated that each of the rear wheels and front wheels involves the mechanism just described and that such mechanism is individually and selectively operable under the guidance of the operator of the motive power unit.

The front wheels 7 of the motive power unit are also individually and selectively steerable by the means which has just been described with respect to one of the rear wheels. With reference to FIG. 12 of the drawings it is clearly indicated that the front wheels are mounted on the arms 79 and 101 and each front wheel is provided with a cylinder 123, however, with respect to the front wheels assembly, the cylinders 123 are pivotally mounted at their rear ends to the side members 25 of the main chassis.

Figure 6:
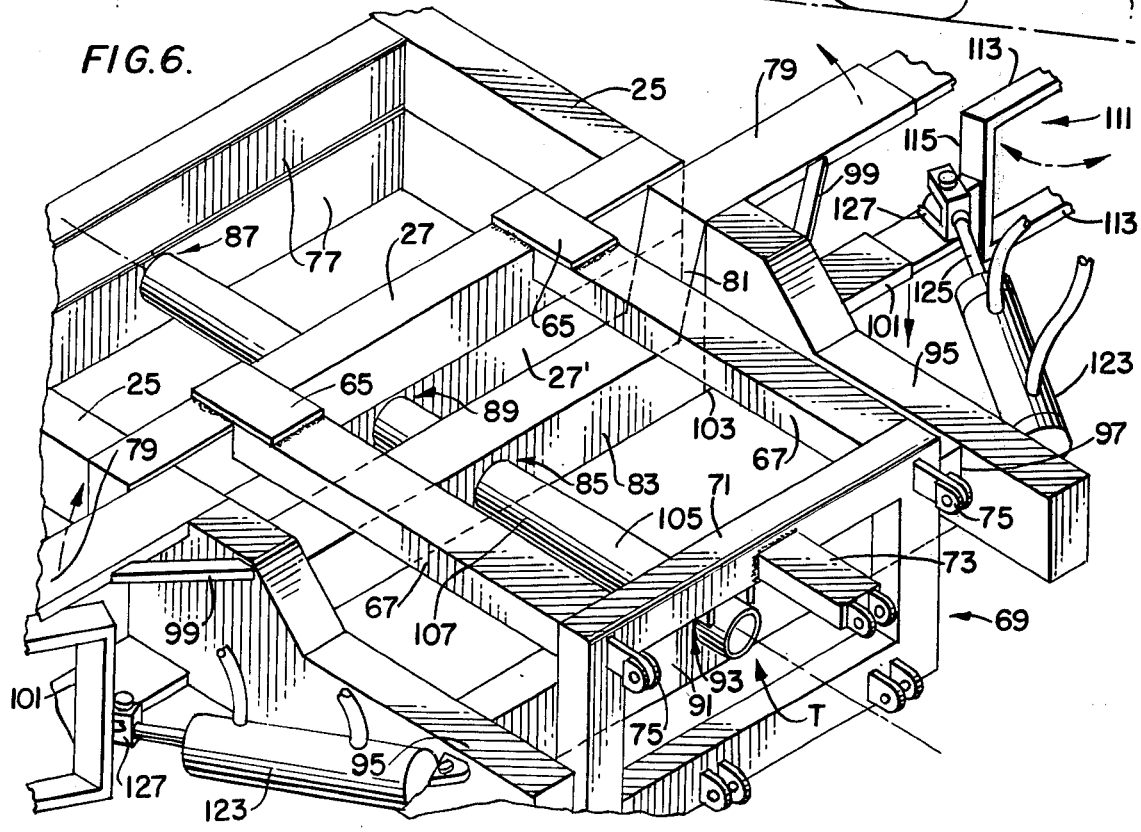
FIG. 6 is a fragmentary perspective view of the rear wheel assembly permitting rocking motion.

Consideration of FIG. 5 of the drawings shows in phantom lines how the rear wheels rock to accommodate ground unevenness as the farm implement travels thereover and this rocking movement is especially illustrated and made clear in FIGS. 6 and 7 of the drawings. It must be understood that only the rear wheels are mounted to allow and produce such rocking motion. When the rear wheels rock the arm members 79 and 101 are pivoted either upwardly or downwardly on the pivot element 105 and since the arms 101 are fixed to the beams 95 these beams will also have up and down movement imparted thereto, as will the cylinders 123 to maintain their proper positions with respect to the arms 101. Thus, the rocking structure of this frame work includes the arms 79 and 101, the yoke 111, the cylinders 123 and the beams 95 as well as the rocking transverse member 83. The frame work associated with the rocking frame work is fixed to the chassis and therefore will not rock and this includes the longitudinally extending frame work 67 and the rectangular frame member designated generally by the numeral 69.

It has been stated above that each wheel of the four wheel drive is independently and selectively operable by hydraulic means. In FIG. 8 of the drawings one of the rear wheels has been illustrated and since the drive means for each wheel is similar, only one will be described in detail. It is to be appreciated that a hydraulic circuit and drive system for the wheels which is controllable by the operator of the motive power unit is provided and will be described in detail. The rim 150 of the wheel has fixed thereto an inwardly extending annular flange 152 which is bolted or otherwise affixed as at 154 to an integral part 156 of the torque hub 158. The hydraulic motor 160 is operatively connected to the torque hub for driving the wheel. It is to be understood that the operation of each motor 160 is controllable by the operator in the cab of the motive power unit, through the hydraulic circuit disclosed in FIG. 14 of the drawings.

Incorporated in this combination is a rear wheel centering device which is designated in its entirety by the numeral 131 and it is to be understood that each rear wheel mounting and steering mechanism, as disclosed in FIG. 8 of the drawings, is provided with a rear wheel centering device 131. This rear wheel centering device, which is shown in FIGS. 8–10, comprises a plate 133 which is mounted on the underside of arm 79, any desirable means may be used for mounting this plate. The under side of the plate is provided with a pair of cam segments 135 and 137. Mounted on the upper member 113 of the yoke 111 is a pair of micro switches 139, each such switch having a feeler element 141 which is in contact with the cam segments 135 and 137. When the operator desires, as when the implement is traveling over a road, he may place the switches 139 in operation with their feelers in contact with the segments and through an electric circuit, which will be understood by one skilled in this discipline, and when the feelers are in proper positions on the segments each rear wheel will be brought into centered position through the actuation of the solenoid controlled valves 294 and 296 which are disclosed in FIG. 15 of the drawings.

As the farm implement travels over the field, the tiller assembly 3 will work the soil and since the wheels of the motive power unit may compact the worked soil, the scarifiers 19 are mounted behind each rear wheel 9 to loosen the soil. Each scarifier is mounted on a bracket member designated generally by the numeral 20 and each one of these brackets 20 is actuable to a raised position to move the scarifiers out of contact with the soil, this is accomplished by means of cylinders 22, a piston rod 24 and a link member 26 which is operatively connected to the mounting bracket 20. Each hydraulic cylinder is controllable and operable by the operator of the motive power unit.

The planter 5 may be raised and lowered from and to the soil by means of a draft linkage arrangement designated in its entirety by the numeral 28. Cylinders 30 are provided having piston rods 32 connected to a clevis 34 which is in turn connected to a draft mechanism 36 for this raising and lowering operation.

Figure 14:
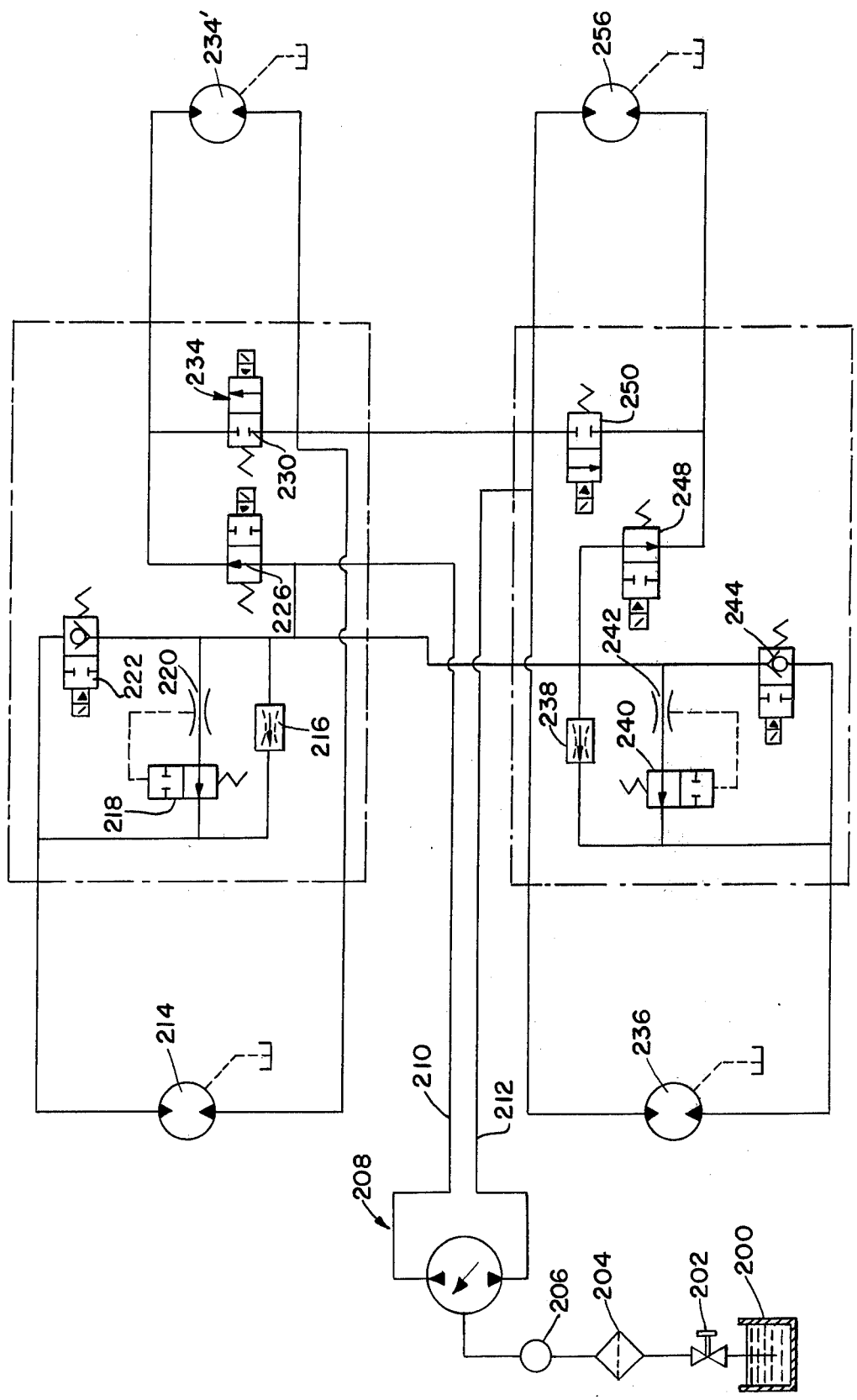
FIG. 14 is a schematic diagram of the wheel drive system.

In FIG. 14 of the drawings, I have illustrated a hydraulic circuit for the wheel drive system for the farm implement. The numeral 200 has been used to designate the fluid reservoir and a manual shut-off valve 202 is in the line from the reservoir. A filter 204 is included in the line and a charge pump 206 is included therein. At 208 a variable volume bi-directional hydraulic pump is employed so that under the control of the operator of the farm implement fluid under pressure may be directed through the line 210 or 212. At 214 I have illustrated a right front wheel fixed displacement bidirectional hydraulic motor and at 216 in one of the lines from the right front wheel motor is inserted a flow control valve which is temperature compensated. A two way, two positioned pilot on-off valve 218 having a flow control pilot orifice 220 is provided. At 222 a 2 way, 2 position, solenoid controlled pilot actuated on-off valve with checked reverse flow is provided. A 2 way, 2 position, solenoid controlled pilot actuated on-off is at 226 while at 230 is another. At 234' is a hydraulic motor for operating the right rear wheel (one of the wheels 9). At 236, I have disclosed the left front fixed displacement bidirectional hydraulic motor. A further temperature compensated flow control valve is shown at 238 and at 240 is illustrated a two way, two positioned pilot operated on-off valve and at 242 is disposed a flow controlled pilot orifice. A 2 way, 2 position, solenoid controlled pilot actuated on-off valve with checked reverse flow is at 244. At 248 and 250 are 2 way, 2 position solenoid controlled pilot actuated on-off valves. The left rear wheel fixed displacement bi-directional hydraulic motor is illustrated at 256.

It will now be apparent that the operator of the motive power unit may control the drive actuation of the four wheels of the unit by causing actuation of the various solenoids to open and close the valves in the fluid flow lines as has just been described.

FIG. 15 illustrates the hydraulic circuit for the steering system of the motive power unit 1. At 258 I have disclosed the fluid line from the fluid pump and a priority flow control valve 260 is inserted in this line which extends to a Charlynn Orbital steering unit 262, an oil reservior 264 being provided. I have used the numeral 266 to designate the right steering cylinder which is one of the cylinders 123, and the numeral 268 defines an oil reservoir while the left front steering cylinder carries the numeral 270 and diagrametically denotes one of the cylinders 123. The numeral 272 designates an adjustable sequence valve pilot operated and the numeral 274 designates an adjustable relief valve pilot operated. Pilot operated check valves are indicated at 276 and 278 while the numeral 280 describes check valves. The right rear steering cylinder is designated by the numeral 282, which corresponds to one of the cylinders 123, and the left rear steering cylinder 284 corresponds to one of the cylinders 123. At 286 is a three way, two position controlled directional control valve, and 288 designates a three way, two position controlled directional control valve. The automatic steering valves at 290 and 292 and are 3 way, 2 position solenoid controlled directional control valves.

It will now be apparent that the steering of the four wheels of the unit may be controlled by the operator of the unit by causing actuation of the various solenoids to open and close the valves in the fluid flow lines as has just been described.

What is claimed is:

1. A farm implement including, in combination, a motive power unit including drive wheels so that said unit may travel over the ground, a motor housed in said unit, a tiller connected to and pushed by said unit as it travels forwardly, and said tiller in operative position being in contact with the soil, said unit including a chassis and a cradle is provided and said motor is fixed thereto, said cradle being connected to said chassis and being rockable on a transverse horizontal axis with respect thereto, said motor being rockable with said cradle, a drive shaft from said motor to said tiller for the operation of the tiller thereby, said tiller being detachably fixed to said cradle in operative position movable therewith as the cradle is rocked, means operably connected at one end to said cradle and at the other end to said chassis of said motive power unit for causing rocking of said cradle to lift said tiller from the ground when said cradle is rocked upwardly to thereby maintain the drive shaft in alignment with said motor and tiller, said chassis having side frame members, pivoting means connected to said side frame members and extending therebetween and operably connected to said cradle adjacent the rear end thereof whereby said cradle may rock on said pivoting means and said means which is operably connected at one end to said cradle is connected at its other end to a supporting member fixed to said chassis and disposed in a plane above the point of connection of said one end of said means, said supporting member including a pair of transversely spaced upstanding elements being fixed to said chassis and extending thereabove, a spanning element fixed to the tops of said upstanding elements and extending therebetween in a plane above the point of connection of said one end of said means, and said means being pivotally connected at its other end to said spanning element of said supporting member, and said supporting member is of generally rectangular configuration and said transversely spaced upstanding elements extend a distance below said chassis and a lower spanning element is fixed to the bottoms of said upstanding elements and extends therebetween in a plane below said cradle.

* * * * *